Figure 1:
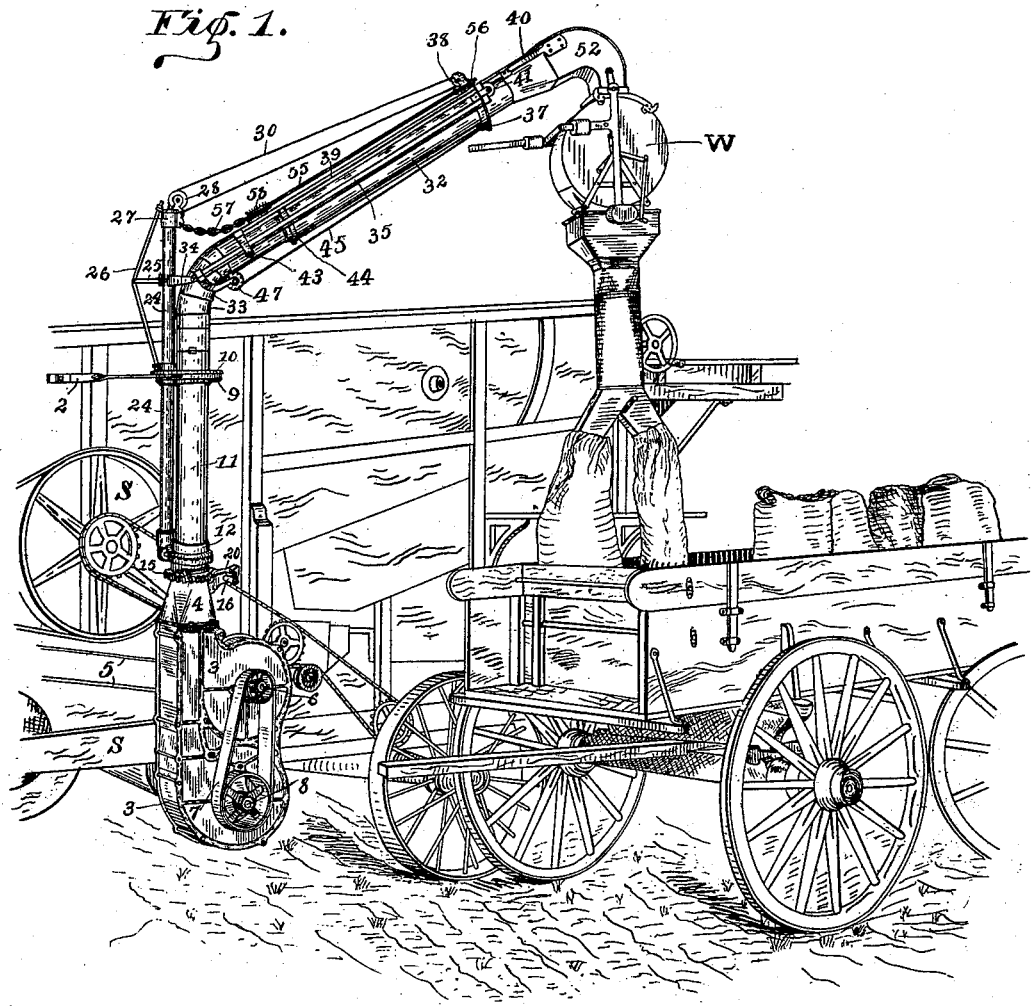

No. 623,109. Patented Apr. 11, 1899.
J. B. SCHUMAN.
PNEUMATIC ELEVATOR.
(Application filed Jan. 30, 1899.)

(No Model.) 5 Sheets—Sheet 1.

WITNESSES:
C. S. Pryt.
J. A. Walsh.

INVENTOR
James B. Schuman,
BY Chester Bradford,
ATTORNEY.

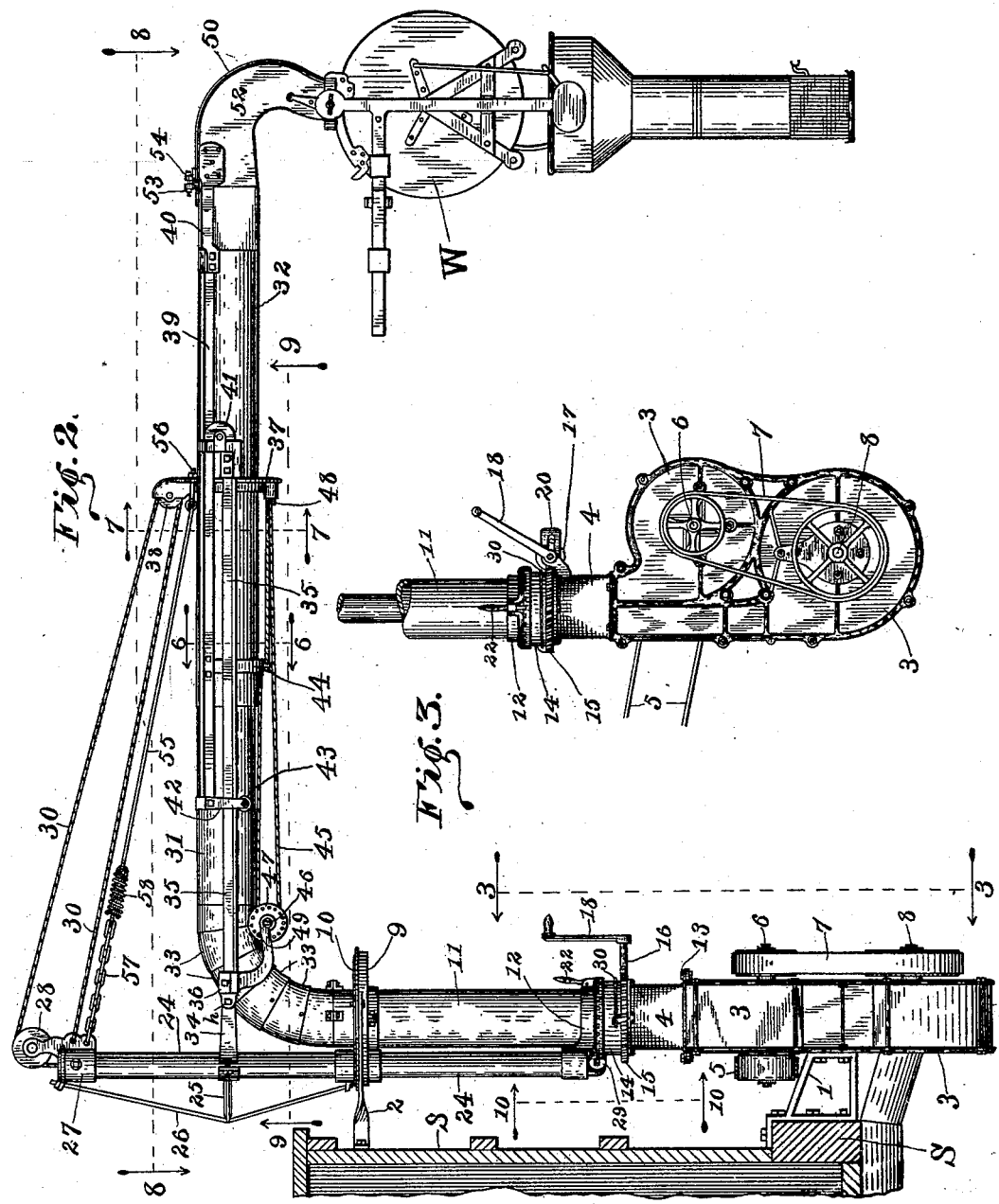

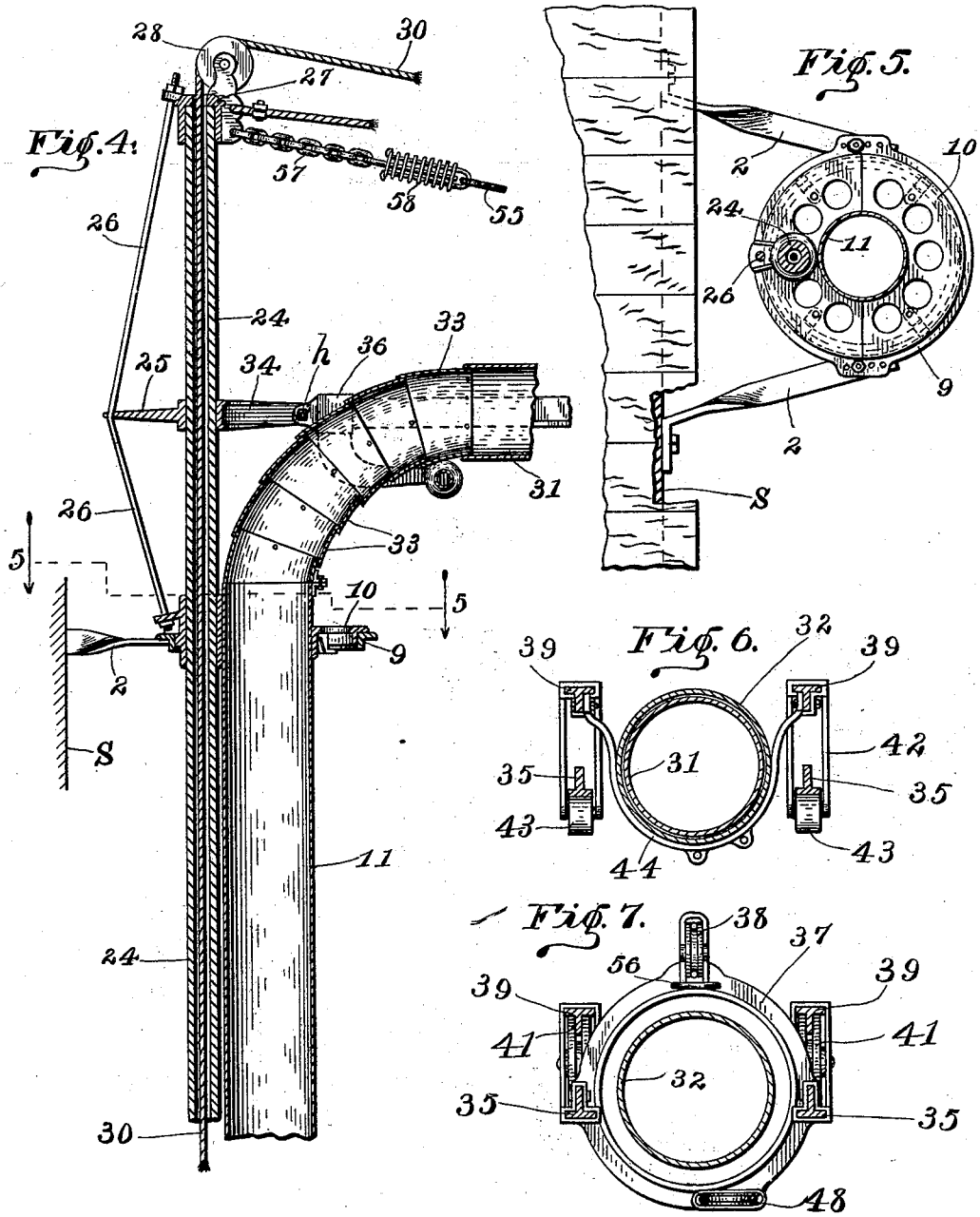

No. 623,109. Patented Apr. 11, 1899.
J. B. SCHUMAN.
PNEUMATIC ELEVATOR.
(Application filed Jan. 30, 1899.)
(No Model.) 5 Sheets—Sheet 4.
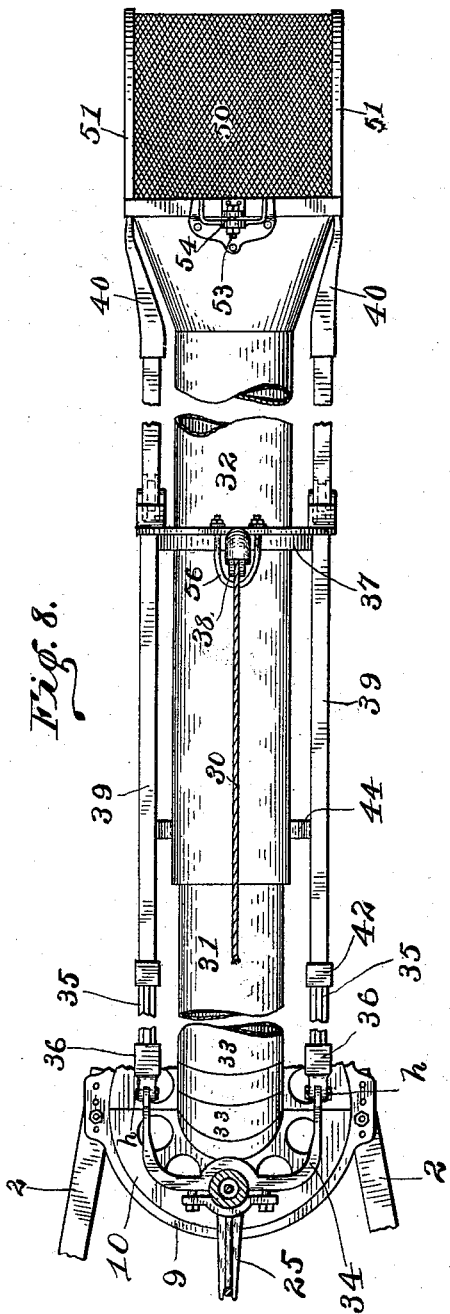
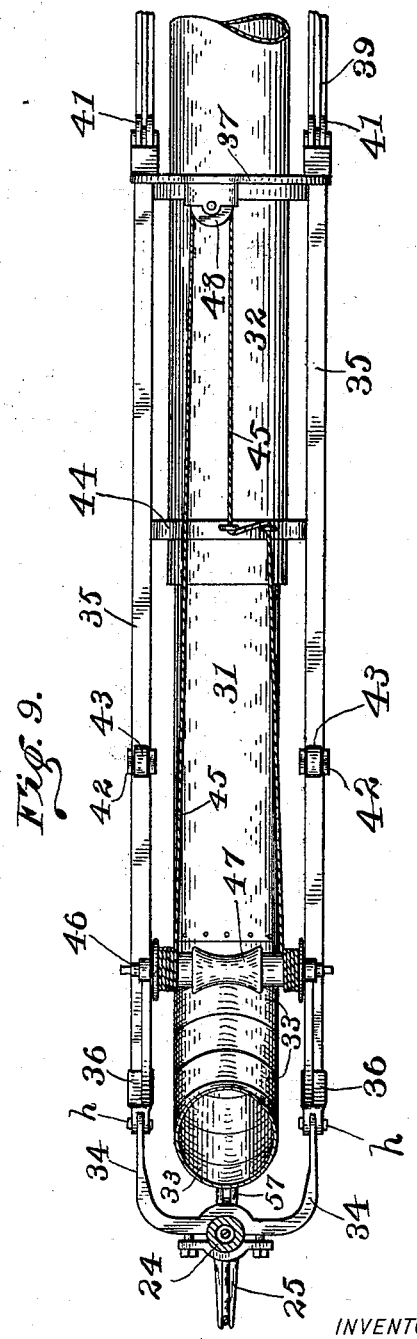
WITNESSES:
C. S. Frye.
J. A. Walsh.
INVENTOR
James B. Schuman,
BY
Chester Bradford,
ATTORNEY.
THE NORRIS PETERS CO., PHOTO-LITHO., WASHINGTON, D. C.

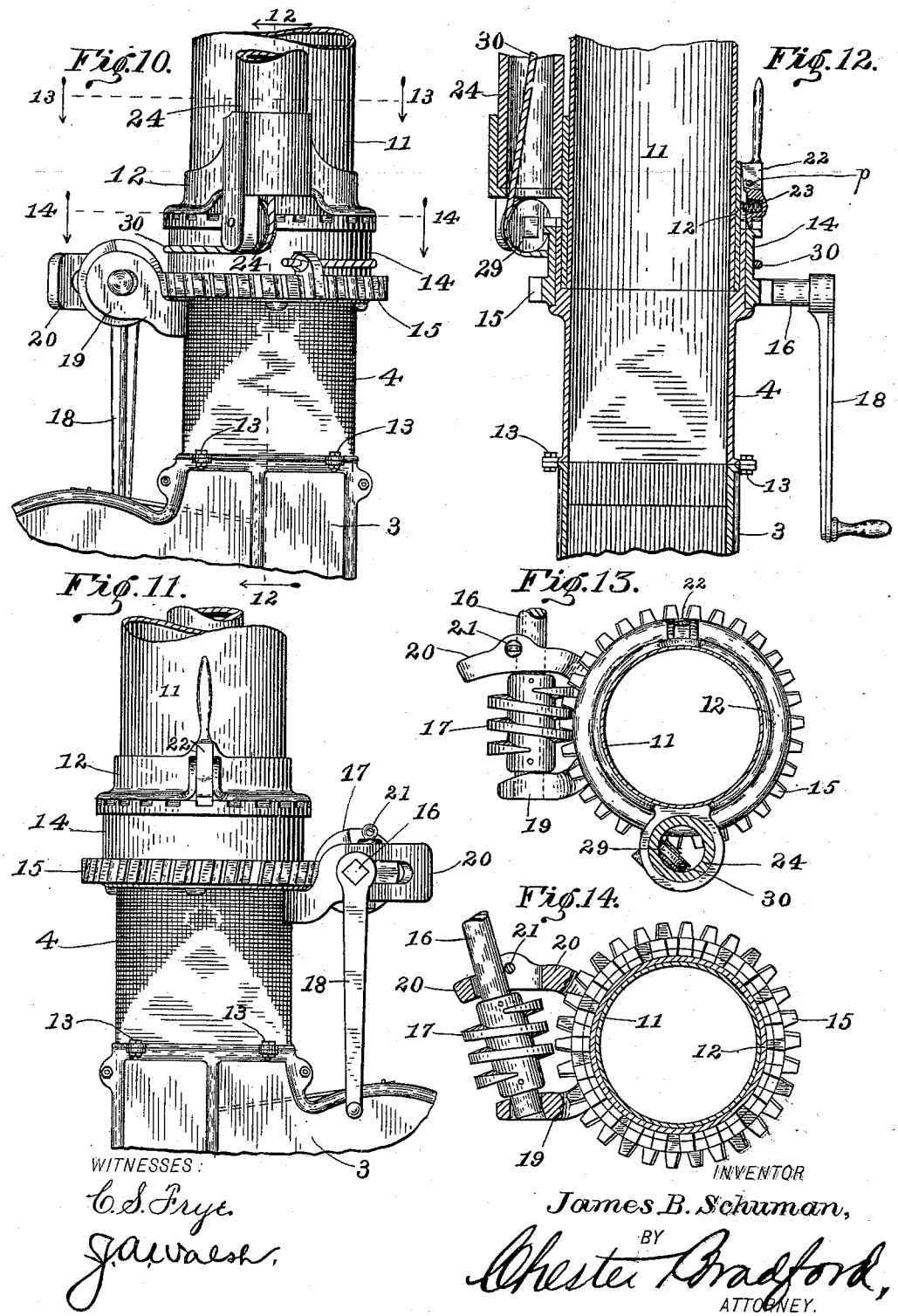

UNITED STATES PATENT OFFICE.

JAMES B. SCHUMAN, OF COLUMBIA CITY, INDIANA, ASSIGNOR TO THE PNEUMATIC ELEVATOR AND WEIGHER COMPANY, OF INDIANAPOLIS, INDIANA.

PNEUMATIC ELEVATOR.

SPECIFICATION forming part of Letters Patent No. 623,109, dated April 11, 1899.

Application filed January 30, 1899. Serial No. 703,821. (No model.)

*To all whom it may concern:*

Be it known that I, JAMES B. SCHUMAN, a citizen of the United States, residing at Columbia City, in the county of Whitley and State of Indiana, have invented certain new and useful Improvements in Pneumatic Elevators, of which the following is a specification.

My present invention relates to that class of machines for handling grain commonly used in connection with threshing-machines, an example of which is shown and described in Letters Patent of the United States No. 603,925, issued May 10, 1898, upon my application, to The Pneumatic Elevator and Weigher Company; and it principally consists in certain improvements whereby the elevator-tube is improved in construction and operation and is adapted to be raised, lowered, extended, retracted, and adjusted in order to adapt it to varying situations, and whereby it may be securely held to its various adjusted positions, all as will be hereinafter more particularly described and claimed.

Referring to the accompanying drawings, which are made a part hereof, and on which similar letters and numerals of reference indicate similar parts, Figure 1 is a perspective view of such a pneumatic elevator applied to use on a threshing-machine for elevating the grain as it comes from such a machine and conveying the same to an automatic weigher by which said grain is weighed or measured; Fig. 2, a side elevation of such an apparatus when the upper division of the conveyer-tube is extended and is arranged horizontally at right angles with the separator; Fig. 3, a side elevation of the casing or housing containing the throwing-wheel and blast-fan and which will hereinafter be called the "elevator-boot," that being its most common designation; Fig. 4, a vertical sectional view, on a somewhat enlarged scale, through the flexible joint uniting the two divisions of the conveyer-tube and immediately adjacent parts, including the upper turn-table, in which said tube and its mast are carried; Fig. 5, a horizontal sectional view looking downwardly from the dotted line 5 5 in Fig. 4; Figs. 6 and 7, horizontal sectional views as seen when looking in the direction indicated by the arrows from the dotted lines 6 6 and 7 7, respectively, in Fig. 2; Fig. 8, a top or plan view of the horizontal division of the elevator-tube and immediately adjacent parts as seen when looking downwardly from the dotted line 8 8 in Fig. 2, certain portions being broken away and the view thus shortened in order that the larger scale used may be employed; Fig. 9, an under side plan of a portion of the parts shown in Fig. 8 as seen when looking upwardly from the dotted line 9 9 in Fig. 2; Fig. 10, a view on an enlarged scale of the lower turn-table carrying the elevator-tube and its mast and immediately adjacent parts as seen from the dotted line 10 10 in Fig. 2; Fig. 11, a fragmentary view on the same scale as Fig. 10, showing a portion of the parts shown on a smaller scale in Fig. 3; Fig. 12, a central vertical sectional view as seen from the dotted line 12 12 in Fig. 10; Fig. 13, a horizontal sectional view as seen when looking downwardly from the dotted line 13 13 in Fig. 10, the worm being shown in engagement with the screw-gear as when ready to manipulate the elevator and tube; and Fig. 14, a horizontal sectional view as seen when looking downwardly from the dotted line 14 14 in Fig. 10, the screw being out of engagement and the upper portions of the bearings for the screw-shaft being broken away to show their form more plainly.

The apparatus is illustrated in position for use secured to the side of a threshing machine or separator, and in Fig. 1 the various parts are shown as adjusted to the positions which they occupy when the elevator is raised to the position occupied by it when "bagging" grain in a wagon.

Brackets or braces 1 are shown as the means by which the boot is connected, by means of suitable bolts and lag-screws, to the sill of the separator S, and other brackets or braces 2 unite the outer or stationary ring of the upper turn-table to the upper portion of said separator, also by means of suitable bolts and lag-screws, as shown especially in Fig. 2 and as will be readily understood. The boot 3 contains the throwing-wheel and the blast-fan substantially as shown and described in my above-mentioned patent and has a neck 4, which extends up to and connects with and immediately supports the elevator-tube. In the arrangement shown the fan is driven by a belt 5, running to a suitable pulley on the fan-shaft 6, and the throwing-wheel is driven by a belt 7, running to a suitable pulley on its shaft 8.

The braces or brackets 1 are not intended to be shifted or adjusted after being once secured in place. The brackets or braces 2, however, are connected to the stationary circular turn-table ring or frame 9, which carries the turn-table 10 adjustably. In the construction shown the adjustment is effected by providing several holes in flanges on said ring 9, as best shown in Fig. 5, into any of which the connecting-bolts may be inserted, as will be readily understood, and by this means a proper upright position of the vertical members of the apparatus relative to the body of the threshing-machine is secured without reference to the precise construction of the latter. As is well known, the bodies of threshing-machine separators vary somewhat in construction, and by this means I am enabled to connect and adjust my apparatus properly to the various kinds.

The trunk or conveyer-tube of my apparatus is in two divisions, one of which is substantially vertical and of a height to reach the average required elevation, while the other extends outwardly from the upper end of the vertical division, and the two divisions are connected together at the turn by suitable pivoted joint members. As best shown in Fig. 12, the vertical member 11 has rigidly secured upon its lower end a cast-metal sleeve 12, which is seated in a suitable recess formed therefor in the upper portion of the neck 4 of the boot 3, said neck and said boot being connected by suitable bolts 13. Mounted upon the outer side of the upper portion of the neck 4 is a sleeve-like winding drum or cylinder 14, the lower edge or flange whereof has a screw-gear 15, which is preferably formed integrally therewith, and, as best shown in Figs. 13 and 14, I provide a suitable shaft 16, arranged alongside this screw-gear and mount a worm 17 thereon, which engages with and is adapted to drive said screw-gear. The driving is usually performed by means of a removable crank 18. The worm-shaft 16 is mounted in the two bearings 19 and 20, which project outwardly from and are preferably formed integrally with the neck 4. As best shown in Fig. 14, these bearings are so formed that the worm may be swung out of engagement with the screw-gear, and when this is desired (as is sometimes the case when a frequent shifting of the discharging end of the elevator from one position to another, as from one wagon to another, in loading two wagons alternatively, as will be presently described) it can readily be done by removing the pin 21 and shifting the shaft 16 to outside of said pin in the bearing 20, as shown in Fig. 14, said pin being so arranged as to hold the shaft to either position, as will be readily seen upon an inspection of Figs. 13 and 14. The upper edge of the neck 4 contains a series of notches, and the upper edge of the winding-drum 14 also contains a corresponding series of notches. A lock 22 is carried by the sleeve 12 on the lower end of the tube-section 11, and this may be shifted to engage with either series of notches at will. I have shown this lock as a simple lever, whose fulcrum is a pivot $p$ and the point of which is adapted to travel transversely across the upper edges of the neck and of the winding-drum and to engage with any desired notch in either; but obviously any form of catch or lock capable of shiftingly engaging with these two sets of notches would answer the same purpose and be the equivalent for this purpose of said pivoted lever. Normally in use the elevator-tube and the winding-drum should be locked together, so that the turning of the worm will shift the position of the elevator radially without affecting its position vertically, and I have therefore provided a spring 23, by which the engaging point of the pivoted lock 22 is normally held outwardly and in engagement with the teeth or notches in the upper edge of the winding-drum 14. A tubular mast 24 is also mounted in and carried by the sleeve 12 and turn-table 10, which are respectively provided with hub-like portions to receive said mast and which therefore also moves with said parts as they revolve. The upper portion of said mast above the turn-table 10 I prefer to truss in order to give it additional strength and stiffness, and said truss consists of a projecting arm 25 and a suitable truss-rod 26. The lower end of said truss-rod is connected to the turn-table 10. It bears at an intermediate point on the arm 25, and at its upper end it is connected to a suitable ear on the cap-piece 27, which latter is placed upon the upper end of said mast, all as best shown in Figs. 2 and 4. Said cap-piece also forms the bearing for the sheave 28, and at or below the lower end of said mast another sheave 29 is carried either by said lower end or by a suitable extension on the sleeve 12. A hoisting-rope 30 runs over these sheaves and is adapted to be operated in raising and lowering the outwardly-extending division of the elevator-tube, as will be presently described. The said outwardly-extending division of the elevator or conveyer trunk or tube consists, preferably, of two telescopic portions 31 and 32. The inner end of the portion 31 is connected to the upper end of the upright division 11 by means of one or more joint-sections 33, six such sections being shown in the drawings, most plainly in Figs. 2 and 4. These joint-sections are so constructed and attached together that the outwardly-extending division of the tube may be raised or lowered, so that the delivery of the grain may take place at a higher or lower elevation. This is very desirable in many situations, and one of its principal advantages is sufficiently indicated in Fig. 1 of the drawings, where the apparatus is illustrated as it appears in use while filling sacks in and thus loading a wagon, the weigher and attached parts being elevated considerably higher when thus used than when filling sacks upon the ground.

The outwardly-extending division of the elevator-tube being in two sections, one of which moves telescopically upon the other, I have provided as a support therefor a frame embodying tracks and also in two sections, one of which is adapted to run upon the other in effectuating the telescopic movement. The outwardly-extending division of the tube is hinged to and supported at its rear end by the upright division, while the frame is hinged to and supported by the mast by the means which will now be described. The structure from which the arm 25 extends has, as best shown in Figs. 8 and 9, a wing on the opposite side of the mast 24, preferably having two other arms 34, which extend forward from said mast to points alongside the trunk or tube, and the above-mentioned frame or track structure is attached by means of hinge-pivots $h$ to the forward ends of said arms. The pivot-point or axial line is substantially centrally above the vertical division of the elevator-tube and also substantially centrally behind the horizontal or outwardly-extending division of said tube, and said pivots constitute the hinge-joint on which the outwardly-extending division of said elevator-tube moves as it is raised or lowered. This frame is principally composed of two bars 35, having on their rear ends joint-pieces 36, which are immediately connected to the wing-arms 34 and which extend forward alongside the outwardly-extending division of the elevator-tube to about midway its length when extended, and which bars are there connected to an annular frame 37, through which the elevator-tube passes. The hoisting-rope 30 is connected to this annular frame 37 preferably by passing around a sheave 38, suitably mounted in a bearing provided therefor in said annular frame.

The second and movable section of the framework or track consists mainly of bars 39, (similar in form to the bars 35,) which are connected by suitable union-pieces 40 to the outer end of the tube-section 32 and extend back over the bars 35 and parallel therewith. Upon wings on the annular frame 37 are mounted rollers 41, upon which the bars 39 rest at an intermediate point. At the rear ends said bars 39 are provided with hangers 42, the lower end of which carry rollers 43, which bear against the under side of the bars 35. The bars 39 of this frame-section are therefore enabled to support the tube-section 32 after the manner of levers, the rollers 41 serving as fulcrums.

Secured to a point near the rear ends of the bars 39 and also to the rear end of the pipe-section 32 is a cross-bar or yoke 44, and to this cross-bar or yoke both ends of a rope 45 are connected. The joint-pieces 36 are extended to form arms, as best shown in Figs. 2 and 4, which arms carry a winding-shaft 46, upon which are suitable sheaves or drums 47. These sheaves or drums and their shaft are always, in effect, and are preferably, in fact, a single structure, but may of course be made separately and afterward assembled, if so desired. The rope 45 is preferably, for convenience, made in two parts, although it is the same, in effect, as if it were a single rope winding around a single drum. This rope, starting from the cross-bar or yoke 44, runs first around a sheave 48, carried by the annular frame 37, thence back to the winding-drum 47, around which it passes, and its other end then runs back to the yoke or cross-bar 44. As above stated, while the rope is divided for convenience and its two parts are wound onto the two spool-like ends of the winding-drum 47 the effect is precisely the same as though it were a single rope and there were a single spool. It is obvious that by turning the shaft 46 in one direction or the other the rope 45 will be so operated as to move the cross-bar 44 and the track-bars 39 and the tube-section 32 outwardly or inwardly, so that said tube-section shall project a greater or less distance from the vertical division of the tube and from the machine to which the apparatus is attached. As will be noticed by an inspection of the drawings, I prefer to make a series of small holes through the rims of the little drums 47 near their peripheries, and a small pin 49, inserted through said holes and resting against the arms by which the shaft 46 is carried, will prevent said parts from revolving, and thus lock the telescopic section of the tube to the position to which it has been adjusted.

For convenience sake and in order to use a single crank I make the shafts 16 and 46 alike, so far as the ends which receive the crank are concerned, as both are never to be actuated at the same time, and therefore the one crank 18 may be readily shifted from one to the other, so as to operate either, as may be desired.

As best shown in Figs. 2 and 8, the outer head or end upon the tube-section 32 is of a peculiar form and construction. It flares out in width and is reduced in thickness, and at the same time is changed from a circular to a rectangular formation in cross-section. It turns over in a "gooseneck" form, as best shown in Fig. 2, and the weigher W, or whatever structure is provided to receive the grain, is suspended thereto. Its outer or convex side 50, as best shown in Fig. 8, is perforated or reticulated, so that the air and dust will escape therethrough, while the grain will be deflected thereby and thrown downwardly into the weigher-hopper. This peculiar construction and arrangement of conveyer-tube head is the result of much study and experiment, and I have demonstrated by practical test that while extremely simple in construction it is highly efficient in operation. It is necessary in a machine of this character that no appreciable air-pressure shall enter the weigher-hopper, as such pressure, if permitted, would affect the accuracy of the operation of the weigher. It is of course equally important that none of the grain shall be permitted to escape. By providing this large perforated or reticulated side to the conveyer-tube head, while providing also a return-curve for guiding the grain back somewhat from the extreme point to which it is thrown, I secure a complete escape of the moving air, which continues on through the perforations with no change of direction of motion, while the grain, being thrown back in a reverse direction by its impact against the inner surface of said perforated side, is wholly freed from the impulse given it by the air-blast and falls into the weigher-hopper merely by its own gravity. Dirty or smutty grain is also scoured in the operation and its quality improved. As the part 50 is subjected to greater wear than any other part of the conveyer and is therefore likely to need to be occasionally renewed, I make it removable. This is conveniently done by forming hook-like ends on the side pieces 51, which will engage with corresponding engaging points at the extreme end of the side pieces 52, and then drawing said part 50 tightly against the edges of said side pieces by means of a bolt 53, which engages with a suitable perforation 54 on the top of the conveyer-tube head just back of said reticulated or perforated portion. By loosening the nut on said bolt the said reticulated or perforated portion may be instantly removed and a new one put in its place, so that it is manifestly an easy matter to renew or replace this portion when worn out or when a different-sized mesh or perforation is required in handling coarser or finer grain or other material.

When an apparatus of this kind is attached to a threshing-machine and is at rest, as when ready for storage or transportation, the outwardly-extending division of the tube is telescoped into its shortest length and is swung around and lies upon the top of the separator, a suitable saddle or rest being preferably provided there to receive it. When the machine has been set in the field or wherever it is to be used, this apparatus is made ready for use by first pulling out on the handle of the lock 22, which locks the part 12 to the neck 4, and then by means of the crank 18 revolving the winding-drum 14 and winding up the rope 30, which passes thence around the sheaves 29, 28, and 38 to a suitable connection on the cap 27. This raises the outwardly-extending division of the conveyer-tube of the machine and elevates it to the required height. The lock 22 is then released, when its point will engage with the notches in the upper edge of the winding-drum 14, when a further revolution of the shaft 16 by means of the crank 18 will bring the discharging end of the structure around to any desired position for use. It will thus be seen that by merely shifting the lock 22 I am enabled to either elevate or lower the conveyer-tube or shift it to any position required.

As is well known, a screw-gear will not slip or give, and therefore so long as the gear is in engagement the parts will remain wherever they are placed. In practical use, however, it is sometimes desirable to release this screw-gear engagement, so that after the conveyer is otherwise adjusted it can be quickly swung on its turn-table back and forth from one position to another by hand. This most frequently occurs when the apparatus is used in loading grain into a wagon, as illustrated in Fig. 1. In such cases when one wagon is filled or nearly filled it is customary to drive another wagon alongside the first and then to swing the conveyer, carrying the weigher and bagger or whatever receptacle is attached to the conveyer, from its position over one to a corresponding position over the other, so that one wagon is being loaded while the other is being driven away and its load discharged. In such cases it is only necessary to remove the pin 21 (the lock 22 being in engagement with the winding-drum 14) and shift the shaft 16 from the position shown in Fig. 13 to the position shown in Fig. 14. The winding-drum 14 being thus locked to the sleeve 12 on the lower end of the conveyer, the rope 30 cannot unwind, so that the elevation is maintained, and the engagement of the screw-gear being released the conveyer structure will freely swing in its turn-tables from point to point, as desired.

As a safeguard against any possible accident after the machine has become old and worn and the rope 30, perchance, becomes rusted and weakened a safety device is provided to prevent the outwardly-extending portion of the elevator-tube and the parts carried thereby from falling should said rope become broken. This safety device is shown in the form of a rod 55, which is connected to the annular frame 37 by any suitable means, such as a yoke 56, while suitable flexibility may be provided for by incorporating in said rod a few links 57 of a chain. This safety device is connected to a suitable eye in the cap-piece 27. Its length is such as to hold the conveyer at the lowest position to which it is usually permitted to descend, and, as shown in Fig. 1, it is sufficiently flexible as not to interfere with the raising of the apparatus to any required height. A spring 58 may be introduced in or attached to this safety-rod, if desired, to receive and counteract the shock or descent in case of breakage; but this I regard as generally unnecessary.

Having thus fully described my said invention, what I claim as new, and desire to secure by Letters Patent, is—

1. The combination, in a pneumatic elevator, of the boot, the fan therein, the delivery-spout discharging into said boot and conveying the material to be elevated thereinto, the conveyer-tube connected to said boot and formed of two divisions joined by a flexible connection, one of which divisions extends upwardly from the boot to the flexible connection and the other of which extends outwardly from said connection and comprises two parts telescopically mounted, turn-tables carrying said conveyer-tube by its vertical division, means for adjusting the outwardly-extending division to a greater or less extended position, and means for adjustably supporting the outer or discharging end at different elevations and for revolving the structure as a whole in its turn-tables.

2. The combination, in a pneumatic elevator, of the boot, the two-division conveyer-tube connected therewith, a flexible joint between the two divisions of said tube, supporting frames or bars extending substantially parallel with said two divisions respectively and hinged together at a point approximately opposite the juncture of the axial lines of said two divisions, and means for supporting and adjusting said parts.

3. The combination, in a pneumatic elevator, of suitable brackets or supports, a turn-table carried by one of said supports, a conveyer-tube one section whereof passes down through said turn-table, a second turn-table at the lower end of said conveyer-tube embodying a sleeve or collar upon the lower portion of the conveyer-tube structure, a hollow mast also carried by said two turn-tables, a sheave carried by the upper end of said mast, a winding-drum below the lower end of said mast, a rope extending from said winding-drum through said hollow mast and over said sheaves, and an outwardly-extending portion of said elevator-tube to which said rope is connected and which is supported and adjusted by means of said rope.

4. The combination, in a pneumatic elevator, of the boot, a conveyer-tube consisting of two divisions united by a joint-section, a mast positioned alongside the vertical division, a wing on said mast, a frame pivoted to said wing, the uniting pivots constituting the axis upon which the outwardly-extending portion of the elevator-tube may be moved, the side bars of which frame extend forward and serve as a track for a telescopically-movable frame, said movable frame, a telescopic section carried thereby, a rope connected to the outer end of the pivoted frame and running over a sheave at the upper end of said mast, and a winding drum or sheave for said rope at or near the lower end of said mast.

5. The combination, in a pneumatic elevator, of the boot, a conveyer-tube consisting of two divisions suitably united, one division being substantially vertical and the other extending outwardly therefrom, said last-named division consisting of two sections telescopically arranged, a track-frame supported near the inner end of the inner telescopic section, a second track-frame suitably mounted upon the first, a cross bar or yoke connecting the bars of said last-named frame and the outer telescopic two-section, winding drums or sheaves mounted on the first-mentioned frame, and a rope extending from said bar or yoke around said winding drum or sheaves.

6. The combination, in a pneumatic elevator, with the boot, a conveyer-tube, and suitable supports, of an annular turn-table frame 9, brackets whereby it is carried, said annular frame and said brackets being adjustably connected whereby the turn-table may be adjusted nearer to or farther from the structure to which said brackets extend, and a turn-table mounted in said annular frame and serving as a principal support for the conveyer-tube and the parts carried thereby.

7. The combination, in a pneumatic elevator, of the fan structure, a conveyer-tube leading from said fan structure, a supporting-head on the outer end of said tube which said head is formed wider and of less thickness than the tube and bent over and under to bring its discharging-point behind its extreme end, the outer wall of said end being formed of perforated or reticulated material whereby the air and dust is permitted to escape in the direction of its motion while the material being elevated is thrown back and discharged in a different direction, and a hopper suspended below said separating-head into which the material being elevated will fall uninfluenced by the force of the air-blast, substantially as set forth.

8. The combination, in a pneumatic elevator, of the boot, a pneumatic tube composed of upright and outwardly-extending portions flexibly united, a mast situated alongside the upright portion, a rope carried by said mast for raising and lowering the outwardly-extending tube portion, a structure within which the upright portion of the pneumatic tube and the mast are mounted at their lower end upon the neck of the boot, and a sleeve-like winding-drum surrounding the same upon which said rope may be wound.

9. The combination, in a pneumatic elevator, of the elevator-boot, a pneumatic tube composed of upright and outwardly-extending portions, a mast situated alongside the upright portion of said tube, suitable mountings for said tube and said mast, a rope carried by and passing down through said mast for raising and lowering said outwardly-extending portion of said tube, a sheave at the lower end of said mast over which said rope passes, and a winding drum or sleeve arranged to revolve horizontally below the end of said mast upon which said rope may be wound.

10. The combination, in a winding apparatus for elevating and lowering the outwardly-extending portion of a pneumatic-elevator tube, with the boot, the two-division elevator-tube, a suitable support, and a suitably-mounted elevating-rope, of a winding-drum for said rope situated above the elevator-boot and provided with a screw-gear, a shaft carrying a worm arranged alongside said screw-gear for revolving said drum, and an elongated bearing for said shaft whereby the worm may be shifted into or out of engagement with said gear.

11. The combination, in a pneumatic elevator, of the elevator-boot, the pneumatic tube, a mast alongside said tube, a structure in which the lower ends of said tube and said mast are mounted, a lock carried thereby, and a winding-drum provided with notches with which the lock will engage, whereby the winding-drum and the tube and mast carrying structure may be locked together or permitted to revolve independently.

12. The combination, in a pneumatic elevator, of the boot, the pneumatic tube, the mast alongside said tube, a structure carrying the lower ends of said tube and said mast, a suitable neck on the boot upon which said structure is mounted having a series of notches in its upper edge, a winding drum or sleeve also having a series of notches in its upper edge, and a lock carried by the structure which carries the tube and mast whereby said structure may be locked to the neck of the housing or to the winding-drum, and means for revolving said winding-drum.

13. The combination, in a pneumatic elevator, of the boot, the pneumatic tube composed of an upright and an outwardly-extending portion, a rope-carrying support, a structure carrying the lower ends of said tube and said support, a suitable lock carried by said structure, a suitable neck on the boot upon which said structure is mounted having a series of notches in its upper edge, a winding drum or sleeve also having a series of notches in its upper edge, and a spring whereby said lock is normally held into engagement with the notches of said winding-drum, said lock being adapted, by compressing said spring, to release the winding-drum and engage with the notches in the upper edges of the neck.

14. The combination, in a pneumatic elevator, of the boot having an upwardly-extending neck, the pneumatic tube composed of an upright and outwardly-extending portions, a rope-carrying support, a structure upon the lower end mounted in a suitable seat in the neck of the boot, a winding drum or sleeve surrounding said neck, a rope running from said winding-drum over said rope-carrying support to the outwardly-extending portion of the pneumatic tube, and means for actuating said winding-drum.

15. The combination, in a pneumatic elevator, of the boot, the pneumatic tube composed of an upright and an outwardly-extending portion, a support for carrying said outwardly-extending portion consisting of a suitable mast, a rope carried by suitable sheaves in connection with said mast, and a safety device whereby the fall of the outwardly-extending portion of the elevator-tube may be prevented in case of the breakage of the rope.

16. The combination, in a pneumatic elevator, of the boot having a neck with notches in its upper edge, a ledge or offset inside said neck forming a turning seat for the tube, and a bearing outside said neck forming a seat for the winding-drum; said pneumatic tube; said winding-drum having a screw-gear; a worm arranged alongside and adapted to drive said screw-gear; a lock carried by the pneumatic tube and adapted to engage alternatively with notches in the upper edge of the winding-drum; a mast seated in the same base-piece with the pneumatic tube and extending up parallel with its lower division; a sheave arranged below the lower end of said mast; a turn-table arranged near the upper end of the vertical division of the pneumatic tube and carrying said tube and mast at that point; a second division of the pneumatic tube flexibly united to the vertical division and extending outwardly therefrom; a wing on the mast; a frame pivoted to said wing and extending out alongside the outwardly-extending division of the pneumatic tube and connected thereto, and a rope connected to said frame and passing over a sheave at the upper end of said mast, thence down through said mast over the sheave at the lower end and around said winding-drum.

17. The combination, in a pneumatic elevator, of the boot; a two-division pneumatic tube, one division whereof extends upwardly from said boot, and the other of which is flexibly united to the upper end of said first-named division and extends outwardly therefrom; a mast positioned alongside the vertical division of the tube and extending above the same; a wing secured to the mast opposite the flexible union between the two divisions of the pneumatic tube; a frame pivoted to said wing and extending out alongside and connected to said outwardly-extended division of the pneumatic tube, and a rope connected thereto running thence over a sheave at the upper end of the mast and thence downwardly to a suitable winding-drum, and said winding-drum.

18. The combination, in a pneumatic elevator, of the boot; a two-division pneumatic tube connected to said boot, one of which extends upwardly and the other outwardly, the two being flexibly united, and the outwardly-extending division being composed of two sections telescopically arranged; a mast positioned alongside the vertical division of said tube and extending above the same and carrying a sheave upon its upper end; a wing on said mast adjacent to the flexible union-piece connecting the two divisions of the pneumatic tube; a two-section track-frame, one section whereof is pivoted to said wing and extends out alongside the outwardly-extending division of the tube, and the second section whereof is connected to the outer section of said outwardly-extending division and is mounted upon and adapted to travel over the said pivoted section; a rope connected to the outer end of the pivoted section and running thence over a sheave on the upper end of the mast and thence downwardly to a winding-drum; said winding-drum; a rope connected by its ends to a point on the telescopic section of the outwardly-extending division of the tube and running thence over suitable sheaves or winding-drums carried on the pivoted section of the track-frame; and said sheaves or winding-drums.

19. The combination, in a pneumatic elevator, of the boot; the pneumatic-elevator tube composed of the two divisions flexibly united; a mast arranged alongside the upright division of the tube from which the outer end of the outwardly-extending division is supported; a two-section track-frame attached to and supported from said mast at a point adjacent to the flexible union-piece uniting the two divisions of the elevator-tube, said track-frame being composed of two bars connected to said mast and provided with an annular frame-piece uniting their outer ends through which the tube-sections pass, and which also carries antifriction trucks or rollers; arms on the rear ends of said bars carrying winding drums or sheaves; two other bars connected to the telescopic section of the tube and extending back thence over said antifriction trucks or rollers and provided at their inner ends with hangers embracing the first-named bars, with antifriction trucks or rollers forming the immediate bearing-points; a yoke or cross-bar connecting said bars to the inner end of the telescopic pipe-section; a sheave carried by the said annular frame part, and a rope connected by its ends to said yoke or cross-bar and running over said last-named sheave and around sheaves or a winding-drum carried by the arms on the first-named bars.

20. The combination, in a pneumatic elevator, of the boot, a conveyer-tube consisting of two divisions suitably united, one division being substantially vertical and the other extending outwardly therefrom, a mast alongside the vertical division, a turn-table structure carrying both said vertical conveyer-tube division and said mast, a suitable supporting-frame for the outwardly-extending division, a hinge-support, 34, upon the mast by which said frame is connected thereto, a rope running from the outer end of said frame over a suitable support on the upper end of said mast, and a suitable winding-drum for winding and unwinding said rope and thus raising and lowering the outer end of said frame and the division of the conveyer-tube carried thereby.

In witness whereof I have hereunto set my hand and seal, at Indianapolis, Indiana, this 28th day of December, A. D. 1898.

JAMES B. SCHUMAN. [L. S.]

Witnesses:
 CHESTER BRADFORD,
 JAMES A. WALSH.